(12) United States Patent
Kwon et al.

(10) Patent No.: US 11,593,657 B2
(45) Date of Patent: Feb. 28, 2023

(54) MACHINE LEARNING DEVICE AND MACHINE LEARNING METHOD OF MACHINE LEARNING DEVICE

(71) Applicant: SAMSUNG ELECTRONICS CO., LTD., Suwon-si (KR)

(72) Inventors: Namyeong Kwon, Suwon-si (KR); Hayoung Joo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1042 days.

(21) Appl. No.: 16/235,500

(22) Filed: Dec. 28, 2018

(65) Prior Publication Data
US 2019/0370661 A1 Dec. 5, 2019

(30) Foreign Application Priority Data
Jun. 5, 2018 (KR) .......................... 10-2018-0064886

(51) Int. Cl.
*G06N 3/08* (2006.01)
*G06N 20/00* (2019.01)
(Continued)

(52) U.S. Cl.
CPC ............. *G06N 3/084* (2013.01); *G06K 9/628* (2013.01); *G06N 3/0481* (2013.01); *G06N 20/00* (2019.01); *G06T 7/0004* (2013.01)

(58) Field of Classification Search
CPC ........ G06N 3/0454; G06N 3/08; G06N 20/00; G06N 3/02; G06N 3/084; G06N 3/0481;
(Continued)

(56) References Cited

U.S. PATENT DOCUMENTS 6,456,899 B1 * 9/2002 Gleason ................ G03F 7/7065
706/900
10,229,346 B1 * 3/2019 Kim ..................... G06V 20/588
(Continued)

FOREIGN PATENT DOCUMENTS

AU      2014201827 A1 * 10/2014 ........... G06F 16/353
KR     1020190073756       6/2019

OTHER PUBLICATIONS

Machine Learning Techniques for Data Mining: A Survey (Year: 2013).*

*Primary Examiner* — Nizar N Sivji
(74) *Attorney, Agent, or Firm* — F. Chau & Associates, LLC

(57) ABSTRACT

A machine learning method of a machine learning device including a machine learning classifier includes receiving, at the machine learning device, an image and first class information associated with the image, generating, at the machine learning device, second class information associated with the image by performing classification on the image by using the machine learning classifier, and as the second class information is generated, updating, at the machine learning device, the machine learning classifier by performing a first learning operation when a guide map is received together with the image and performing, at the machine learning device, a second learning operation different from the first learning operation when the guide map is not received together with the image.

18 Claims, 15 Drawing Sheets

(51) Int. Cl.
  *G06T 7/00*   (2017.01)
  *G06N 3/04*   (2006.01)
  *G06K 9/62*   (2022.01)
  *G06N 3/084*  (2023.01)

(58) Field of Classification Search
  CPC .... G06N 3/063; G06K 9/6267; G06K 9/6262; G06K 9/00536; G06K 9/6227; G06K 9/628; G06K 9/6268; G06T 2207/20084; G06T 2207/20081; G06T 2207/10016; G06T 7/292; G06T 7/0004; G06T 2207/30148; G06V 10/454; G06V 10/82
  See application file for complete search history.

(56)  References Cited

U.S. PATENT DOCUMENTS

| | | | |
|---|---|---|---|
| 2011/0025839 A1* | 2/2011 | Trupke | G01N 21/63 |
| | | | 348/87 |
| 2014/0072204 A1* | 3/2014 | Minekawa | G06T 5/00 |
| | | | 382/149 |
| 2016/0163035 A1* | 6/2016 | Chang | G06K 9/6274 |
| | | | 382/149 |
| 2017/0082555 A1* | 3/2017 | He | G01N 21/9501 |
| 2018/0060702 A1* | 3/2018 | Ma | G06V 10/82 |
| 2018/0275523 A1* | 9/2018 | Biafore | G03F 7/7065 |
| 2019/0188840 A1* | 6/2019 | Kwon | G06N 20/10 |

* cited by examiner

MACHINE LEARNING DEVICE AND MACHINE LEARNING METHOD OF MACHINE LEARNING DEVICE

CROSS-REFERENCE TO RELATED APPLICATIONS

This application claims priority under 35 U.S.C. § 119 to Korean Patent Application No. 10-2018-0064886 filed on Jun. 5, 2018, in the Korean Intellectual Property Office, the disclosures of which are incorporated by reference herein in their entireties.

BACKGROUND

The inventive concept relates to machine learning, and more particularly, to a machine learning device capable of preventing wrong learning, and to a learning method of the machine learning device.

Machine learning devices may operate by generating a machine learning classifier which may determine a category of a target based on iterative learning. Machine learning classifiers may be used in various fields. For example, machine learning classifiers may be used to determine a category of an image captured by a camera. A machine learning device may create the machine learning classifier through the following steps: first, a category determination is made for a number of images; next, a comparison is made between the result of the determination and the actual category of the images; finally, the machine learning classifier is updated based on the result of the comparison.

Machine learning may involve repeatedly updating various weights used to perform the classification. As the weights are repeatedly updated, the machine learning classifier may be trained to determine the category of images from patterns present in the images.

In some cases, images may have specific patterns which hinder machine learning. The presence of these specific patterns may result in suboptimal results from the machine learning classifier. That is, the machine learning classifier may be trained to incorrectly classify images that include these patterns. Accordingly, there is a need to prevent wrong learning of the machine learning classifier due to such patterns.

SUMMARY

Embodiments of the inventive concept provide a machine learning device, which performs machine learning without reduction of performance even though there are images in which specific patterns hindering machine learning are present, and a machine learning method of the machine learning device.

Embodiments of the inventive concept also provide a machine learning device, which supports machine learning by providing a guide for specific images which makes it difficult to perform learning, and a machine learning method of the machine learning device.

According to an exemplary embodiment, a machine learning method of a machine learning device including a machine learning classifier includes receiving, at the machine learning device, an image and first class information associated with the image, generating, at the machine learning device, second class information associated with the image by performing classification on the image by using the machine learning classifier, and as the second class information is generated, updating, at the machine learning device, the machine learning classifier by performing a first learning operation when a guide map is received together with the image and performing, at the machine learning device, a second learning operation different from the first learning operation when the guide map is not received together with the image.

According to an exemplary embodiment, a machine learning method of a machine learning device including a machine learning classifier includes receiving, at the machine learning device, a first image, first class information associated with the first image, and a guide map associated with the first image, generating, at the machine learning device, second class information associated with the first image by performing classification on the image by using the machine learning classifier, comparing the guide map with intermediate data generated in the generating of the second class information, and updating, at the machine learning device, the machine learning classifier depending on a result of the classification and a result of the comparing.

According to an exemplary embodiment, a machine learning device includes a modem that receives an image, first class information associated with the image, and a guide map associated with the image from an image database, and a processor that includes a machine learning classifier and performs machine learning by classifying the image by using the machine learning classifier and updating the machine learning classifier depending on a result of the classifying of the image. The processor obtains second class information associated with the image by classifying the image by using the machine learning classifier, performs first comparison on the first class information and the second class information, performs second comparison on the guide map and intermediate data generated in the classifying of the image, and update the machine learning classifier depending on a result of the first comparison and a result of the second comparison.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept are described in detail and clearly to such an extent that one with ordinary skill in the art may implement the inventive concept.

Figure 1:
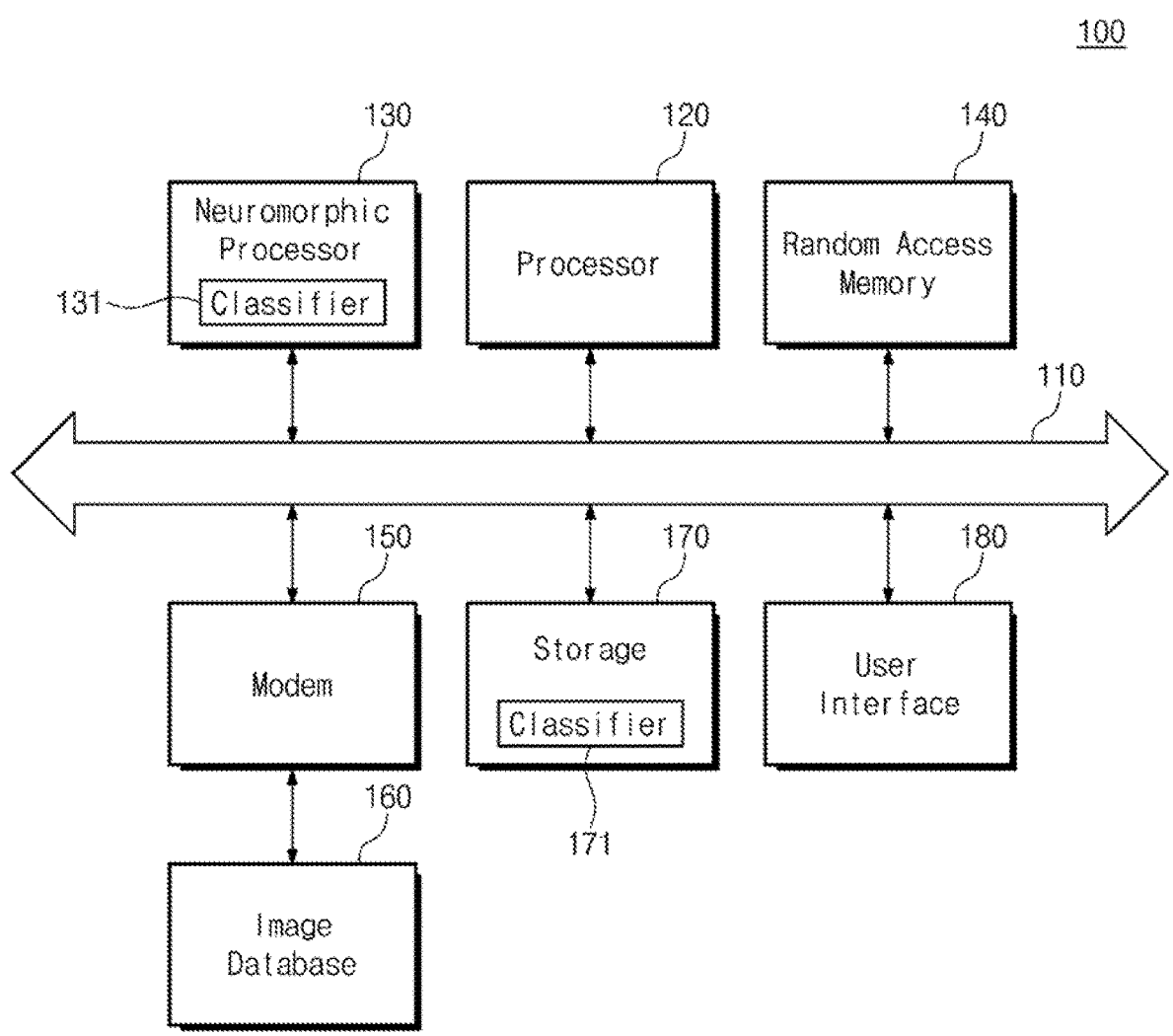
FIG. 1 is a block diagram illustrating a machine learning device according to an embodiment of the inventive concept.

FIG. 1 is a block diagram illustrating a machine learning device 100 according to an embodiment of the inventive concept. Referring to FIG. 1, the machine learning device 100 includes a bus 110, a processor 120, a neuromorphic processor 130, a random access memory 140, a modem 150, an image database 160, storage 170, and a user interface 180.

The bus 110 provides a communication channel between components of the machine learning device 100. The processor 120 may control the machine learning device 100. The processor 120 may execute an operating system, firmware, etc. for the purpose of driving the machine learning device 100.

The processor 120 may direct machine learning to the neuromorphic processor 130 and may support machine learning of the neuromorphic processor 130. For example, the processor 120 may allow the neuromorphic processor 130 to communicate with the random access memory 140, the modem 150, the storage 170, and the user interface 180 through the bus 110.

The neuromorphic processor 130 may perform machine learning under control of the processor 120. The neuromorphic processor 130 may include a machine learning classifier 131. For example, the neuromorphic processor 130 may construct the machine learning classifier 131 under control of the processor 120.

The neuromorphic processor 130 may receive images and pieces of class information (e.g., pieces of first class information) of the images from the image database 160 through the modem 150. The neuromorphic processor 130 may perform machine learning by using the images.

For example, the neuromorphic processor 130 may generate the pieces of class information of the images by using the machine learning classifier 131. The neuromorphic processor 130 may compare the pieces of class information (e.g., pieces of second class information) generated from the images with the pieces of first class information. Depending on a result of the comparison, the neuromorphic processor 130 may update the machine learning classifier 131.

For example, the neuromorphic processor 130 may update the machine learning classifier 131 such that the pieces of second class information generated by the machine learning classifier 131 are identical or similar to the pieces of first class information.

Some of the images transferred from the image database 160 may be transferred together with guide maps. The guide map may include information about whether to perform machine learning more preferentially (or dominantly) based on any portion of an image.

In the case where a specific image is received together with a guide map, the neuromorphic processor 130 may generate the second class information by using the specific image and the guide map. The neuromorphic processor 130 may compare the second class information with the first class information and may update the machine learning classifier 131 depending on a result of the comparison. The machine learning using the guide map will be more fully described later.

The random access memory 140 may function as a working memory of the processor 120 or the neuromorphic processor 130. The random access memory 140 may include a volatile memory such as a static random access memory (SRAM) or a dynamic random access memory (DRAM), or a nonvolatile memory such as a phase change RAM (PRAM), a magnetic RAM (MRAM), a resistive RAM (ReRAM), or a ferroelectric RAM (FRAM).

The modem 150 may receive images from the image database 160 and may transfer the received images to the neuromorphic processor 130. In an embodiment, the image database 160 may be stored separately from the machine learning device 100 and may remotely communicate with the modem 150.

The storage 170 may store data generated by the processor 120. The storage 170 may store an operating system or firmware code which the processor 120 executes. The storage 170 may store the machine learning classifier 131 (e.g., a first machine learning classifier) generated by the neuromorphic processor 130 as a machine learning classifier 171 (e.g., a second machine learning classifier). The storage 170 may include a nonvolatile memory such as a NAND flash memory, a PRAM, a MRAM, a RRAM, or a FRAM.

The user interface 180 may include a user input interface and a user output interface. The user input interface may include input devices, which receive information from a user, such as a keyboard, a mouse, a touch pad, and a microphone. The user output interface may include output devices, which output information to the user, such as a monitor, a beam projector, and a speaker.

In an embodiment, the image database 160 may store images of semiconductor devices. The neuromorphic processor 130 may receive the images of the semiconductor devices from the image database 160 through the modem 150. Pieces of first class information of the images may include information indicating fault types or normality (i.e., an indication of the absence of faults) of the semiconductor devices.

The neuromorphic processor 130 may generate second class information indicating the fault type or normality from the images by using the machine learning classifier 131. The neuromorphic processor 130 may perform machine learning such that the machine learning classifier 131 classifies information of the fault type or normality from the images of the semiconductor devices.

Some of images stored in the image database 160 may include patterns hindering machine learning. Alternatively, some of the images may include specific patterns which makes it difficult to perform learning. The images which have patterns hindering machine learning or making it difficult to perform learning may be transferred to the neuromorphic processor 130 together with guide maps. The neuromorphic processor 130 may perform machine learning by using the guide maps, thus preventing machine learning from being hindered and supporting learning. That is, the reliability of the machine learning classifier 131 is improved.

The machine learning classifier 131 which is generated by the neuromorphic processor 130 may be stored to the storage 170 as the machine learning classifier 171. The machine learning classifier 171 may be transmitted to a test device for testing a defect of a semiconductor device.

An example illustrated in FIG. 1 shows the neuromorphic processor 130 for machine learning provided independently of the processor 120. However, the neuromorphic processor 130 may be included in the processor 120. Alternatively, machine learning may be performed by the processor 120 instead of by a neuromorphic processor 130.

Figure 2:
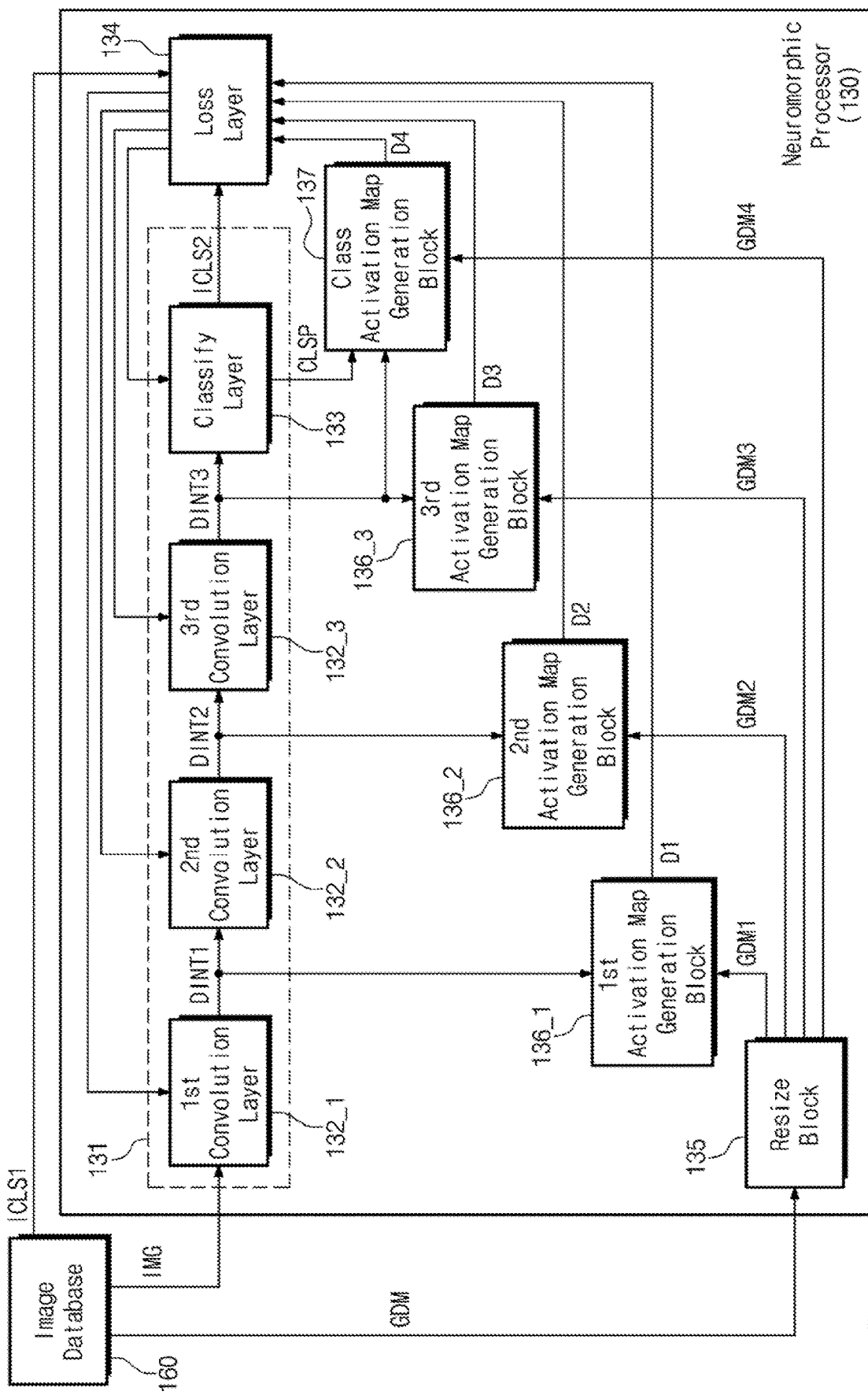
FIG. 2 is a block diagram illustrating a neuromorphic processor and an image database according to an embodiment of the inventive concept.

FIG. 2 is a block diagram illustrating the neuromorphic processor 130 and the image database 160 according to an embodiment of the inventive concept. To avoid unnecessary complication, the data for machine learning is illustrated in FIG. 2 as being directly transferred from the image database 160 to the neuromorphic processor 130. However, it may be understood that the data for machine learning may be transferred to the neuromorphic processor 130 through the modem 150 from the image database 160.

Referring to FIGS. 1 and 2, the neuromorphic processor 130 includes first to third convolution layers 132_1 to 132_3, a classify layer 133, a loss layer 134, a resize block 135, first to third activation map generation blocks 136_1 to 136_3, and a class activation map generation block 137.

The first to third convolution layers 132_1 to 132_3 and the classify layer 133 may constitute the machine learning classifier 131. The loss layer 134, the resize block 135, the first to third activation map generation blocks 136_1 to 136_3, and the class activation map generation block 137 may be components for supporting machine learning of the machine learning classifier 131.

The first convolution layer 132_1 may receive an image IMG from the image database 160. The image IMG may include pixel data including pixel values respectively corresponding to pixels of a camera. The first convolution layer 132_1 may generate first intermediate pixel data DINT1 by convolving its own kernels with the pixel data of the image IMG.

The second convolution layer 132_2 may generate second intermediate pixel data DINT2 by convolving its own kernels with the first intermediate pixel data DINT1. The third convolution layer 132_3 may generate third intermediate pixel data DINT3 by convolving its own kernels with the second intermediate pixel data DINT2.

Pieces of data respectively output from the first to third convolution layers 132_1 to 132_3 are not associated directly with the pixels of the camera. However, since the pieces of data arise from the pixel data of the image IMG and to describe the scope and spirit of the inventive concept more clearly, data which the first to third convolution layers 132_1 to 132_3 output are referenced as intermediate pixel data.

The classify layer 133 may output second class information ICLS2 by performing an operation including the third intermediate pixel data DINT3 and class parameters. The classify layer 133 may calculate values respectively corresponding to classes which the classify layer 133 generates. The values of the classes may indicate the probability that the image IMG belongs to each class. The classify layer 133 may output information of a class having the highest probability as the second class information ICLS2.

The resize block 135 may receive a guide map GDM from the image database 160. For example, the guide map GDM may have the same size as the image IMG. The guide map GDM may include pixel data including weights respectively corresponding to the pixels of the image IMG. The guide map GDM is referenced as pixel data in that the data of the guide map GDM correspond to the pixels of the image IMG.

For example, first pixel data of the guide map GDM may have higher weights than second pixel data. The guide map GDM indicates that pixel data of the image IMG associated with the first pixel data should be referenced more preferentially (or dominantly) than the pixel data of the image IMG associated with the second pixel data.

The resize block 135 may convert the guide map GDM to first to fourth guide maps GDM1 to GDM4 and may transfer the first to fourth guide maps GDM1 to GDM4 to the first to third activation map generation blocks 136_1 to 136_3 and the class activation map generation block 137. Sizes of the guide maps GDM1 to GDM4 which the first to third activation map generation blocks 136_1 to 136_3 and the class activation map generation block 137 require may be different from each other.

For example, the size of a necessary guide map may decrease as it goes from the first activation map generation block 136_1 toward the class activation map generation block 137. The resize block 135 may convert the size of the guide map GDM to the first to fourth guide maps GDM1 to GDM4 having sizes suitable for the first to third activation map generation blocks 136_1 to 136_3 and the class activation map generation block 137.

For example, the resize block 135 may convert the size of the guide map GDM by using at least one of the following: interpolation, pooling, and subsampling. The resize block 135 may provide the first to fourth guide maps GDM1 to GDM4 converted to appropriate sizes, to the first to third activation map generation blocks 136_1 to 136_3 and the class activation map generation block 137, respectively.

The first activation map generation block 136_1 may receive the first intermediate pixel data DINT1 output from the first convolution layer 132_1 and the first guide map GDM1. The first activation map generation block 136_1 may generate a first activation map from the first intermediate pixel data DINT1. The first activation map generation block 136_1 may provide a difference (e.g., D1) between the first activation map and the first guide map GDM1 to the loss layer 134.

The second activation map generation block 136_2 may receive the second intermediate pixel data DINT2 output from the second convolution layer 132_2 and the second guide map GDM2. The second activation map generation block 136_2 may generate a second activation map from the second intermediate pixel data DINT2. The second activation map generation block 136_2 may provide a difference (e.g., D2) between the second activation map and the second guide map GDM2 to the loss layer 134.

The third activation map generation block 136_3 may receive the third intermediate pixel data DINT3 output from the third convolution layer 132_3 and the third guide map GDM3. The third activation map generation block 136_3 may generate a third activation map from the third intermediate pixel data DINT3. The third activation map generation block 136_3 may provide a difference (e.g., D3) between the third activation map and the third guide map GDM3 to the loss layer 134.

The class activation map generation block 137 may receive the third intermediate pixel data DINT3 output from the third convolution layer 1323, class parameters CLSP output from the classify layer 133, and the fourth guide map GDM4. The class activation map generation block 137 may generate a class activation map from the third intermediate pixel data DINT3 and the class parameters CLSP.

The class parameters CLSP may include weights which are used by the classify layer 133 to generate classes, and which may also be used as filters. The class activation map generation block 137 may provide a difference (e.g., D4) between the class activation map and the fourth guide map GDM4 to the loss layer 134.

The loss layer 134 may receive the second class information ICLS2 from the classify layer 133 and may receive first class information ICLS1 from the image database 160. In the case where the guide map GDM is not provided from the image database 160, the loss layer 134 may compare the second class information ICLS2 and the first class information ICLS1 to perform machine learning.

When the guide map GDM is provided from the image database 160, the loss layer 134 may perform machine learning by comparing the second class information ICLS2, the first class information ICLS1, and the differences D1 to D4 transferred from the first to third activation map generation blocks 136_1 to 136_3 and the class activation map generation block 137.

The loss layer 134 may calculate a difference between the first class information ICLS1 and the second class information ICLS2. Depending on the calculated difference, the loss layer 134 may update weights (e.g., the values of synapses in a neural network) of the first to third convolution layers 132_1 to 132_3 and the classify layer 133. The loss layer 134 may update weights such that the second class information ICLS2 becomes closer to the first class information ICLS1.

Also, the loss layer 134 may update weights of the first convolution layer 132_1 as a difference (e.g., the first guide difference D1) output from the first activation map generation block 136_1 decreases, for example, as the first activation map becomes closer to the first guide map GDM1. The loss layer 134 may update weights of the second convolution layer 132_2 as a difference (e.g., the second guide difference D2) output from the second activation map generation block 136_2 decreases, for example, as the second activation map becomes closer to the second guide map GDM2.

The loss layer 134 may update weights of the third convolution layer 132_3 as a difference (e.g., the third guide difference D3) output from the third activation map generation block 136_3 decreases, for example, as the third activation map becomes closer to the third guide map GDM3. The loss layer 134 may update the class parameters CLSP such that a difference (e.g., the fourth guide difference D4) output from the class activation map generation block 137 decreases.

For example, the loss layer 134 may update the class parameters CLSP of the classify layer 133 such that class parameters corresponding to the first class information ICLS1 among the class parameters CLSP becomes closer to the fourth guide map GDM4.

According to an embodiment of the inventive concept, the neuromorphic processor 130 may perform back propagation by updating weights of the machine learning classifier 131 based on a result of comparing the first class information ICLS1 and the second class information ICLS2. Additionally or alternatively, the neuromorphic processor 130 may also perform back propagation by individually updating weights of each layer of the machine learning classifier 131 by using the guide map GDM.

That is, additional information for machine learning may be obtained from the first to third intermediate pixel data DINT1 to DINT3 generated in the process in which the machine learning classifier 131 generates the second class information ICLS2. Applying the obtained additional information to the back propagation may be accomplished by providing the obtained additional information to the loss layer 134 without changing a structure of the machine learning classifier 131.

An update direction may be intended by the guide map GDM upon updating weights of each layer of the machine learning classifier 131. For example, in the case where a pattern which hinders machine learning or makes it difficult to perform learning is included in the image IMG, a guide map GDM for attributing a high weight to pixel data from which the pattern is excluded may be used. Depending on the guide map GDM, the machine learning classifier 131 may learn that the pixel data from which the pattern is excluded is preferential or dominant. Accordingly, since the machine learning is prevented from being hindered and the learning is supported, the reliability of the machine learning classifier 131 is improved.

An embodiment is described where the machine learning classifier 131 includes the three convolution layers 132_1 to 132_3. However, the number of convolution layers included in the machine learning classifier 131 is not limited to three layers.

Also, a description is given where the activation map generation blocks 136_1 to 136_3 and the class activation map generation block 137 are provided to the convolution layers 132_1 to 132_3 and the classify layer 133, respectively. However, an activation map generation block or a class activation map generation block may be provided any number of the convolution layers and the classify layer 133.

In an embodiment, the machine learning classifier 131 is a convolutional neural network (CNN). However, the inventive concept is not limited to CNNs, and may be applied to various other neural networks or machine learning systems.

Figure 3:
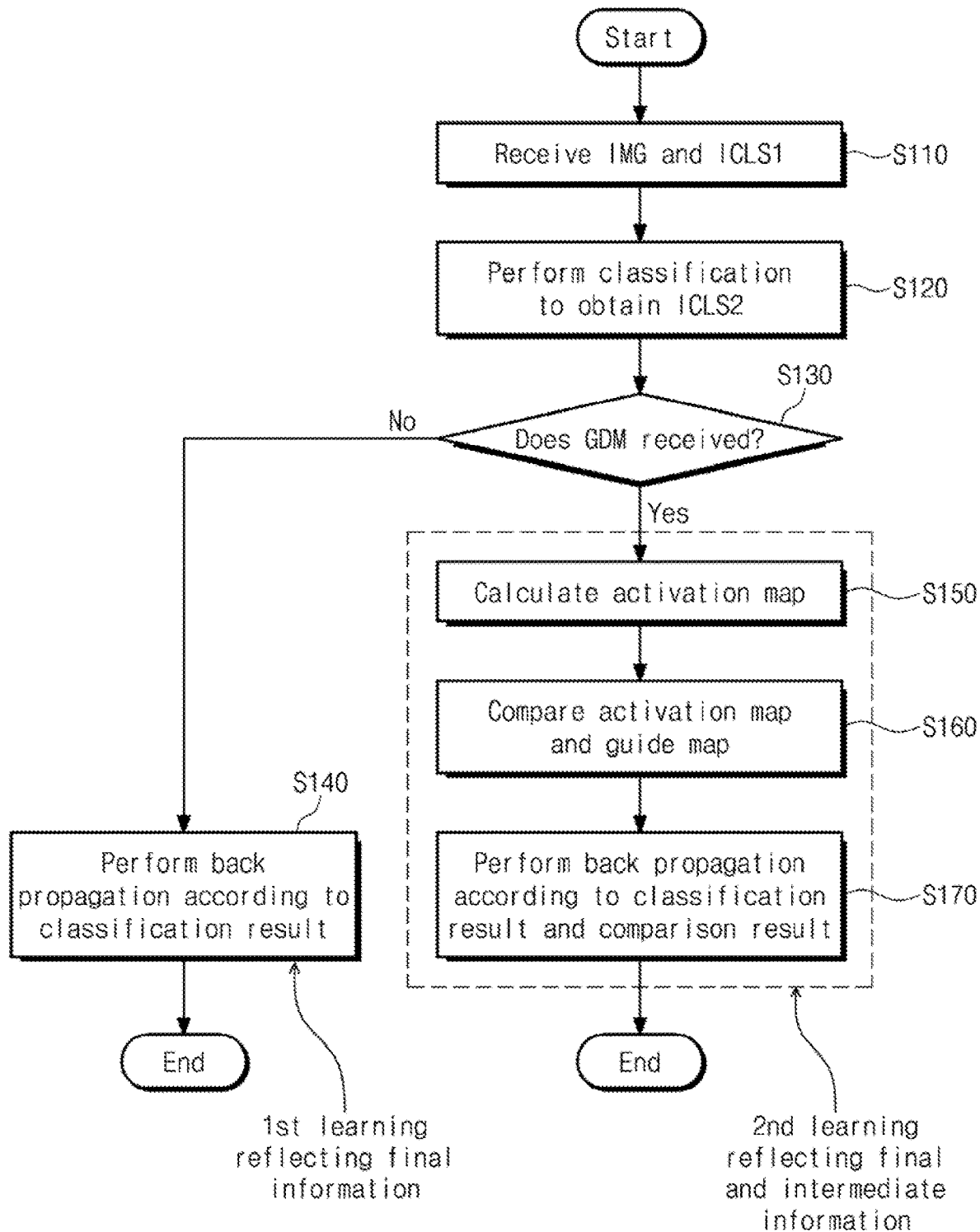
FIG. 3 is a flowchart illustrating an operating method of a neuromorphic processor according to an embodiment of the inventive concept.

FIG. 3 is a flowchart illustrating an operating method of the neuromorphic processor 130 according to an embodiment of the inventive concept. Referring to FIGS. 2 and 3, in operation S110, the machine learning classifier 131 may receive the image IMG and the first class information ICLS1 from the image database 160.

In operation S120, the machine learning classifier 131 may classify the image IMG to obtain the second class information ICLS2. In operation S130, the neuromorphic processor 130 may determine whether the guide map GDM is received together with the image IMG and the first class information ICLS1.

In the case where the guide map GDM is not received, in operation S140, the neuromorphic processor 130 may perform back propagation depending on a result of the classification. For example, the neuromorphic processor 130 may compare the first class information ICLS1 and the second class information ICLS2 and may perform the back propagation depending on a result of the comparison. Operation S140 may be a first learning operation to which final information of the machine learning classifier 131 is applied.

In the case where the guide map GDM is received, the neuromorphic processor 130 may calculate an activation map. For example, the first to third activation map generation blocks 136_1 to 1363 and the class activation map generation block 137 may generate the first to third activation maps and the class activation map, respectively.

In operation S160, the first to third activation map generation blocks 136_1 to 136_3 and the class activation map generation block 137 of the neuromorphic processor 130 may compare the first to third activation maps and the class activation map with the guide maps GDM1 to GDM4. In operation S170, the neuromorphic processor 130 may perform the back propagation based on the classification result and the comparison result.

Operation S150 to operation S170 may represent a second learning operation to which the final information and intermediate information of the machine learning classifier 131 are applied. The neuromorphic processor 130 according to an embodiment of the inventive concept may select and perform one of the first learning operation and the second learning operation depending on whether the guide map GDM exists.

An image which does not have a pattern hindering machine learning, or which makes it easy to perform machine learning, may be provided without a guide map GDM. Accordingly, such an image may be applied to the machine learning classifier 131 through the first learning operation. An image having a pattern hindering machine learning is provided together with the guide map GDM. Accordingly, such an image may be applied to the machine learning classifier 131 through the second learning operation.

Figure 4:
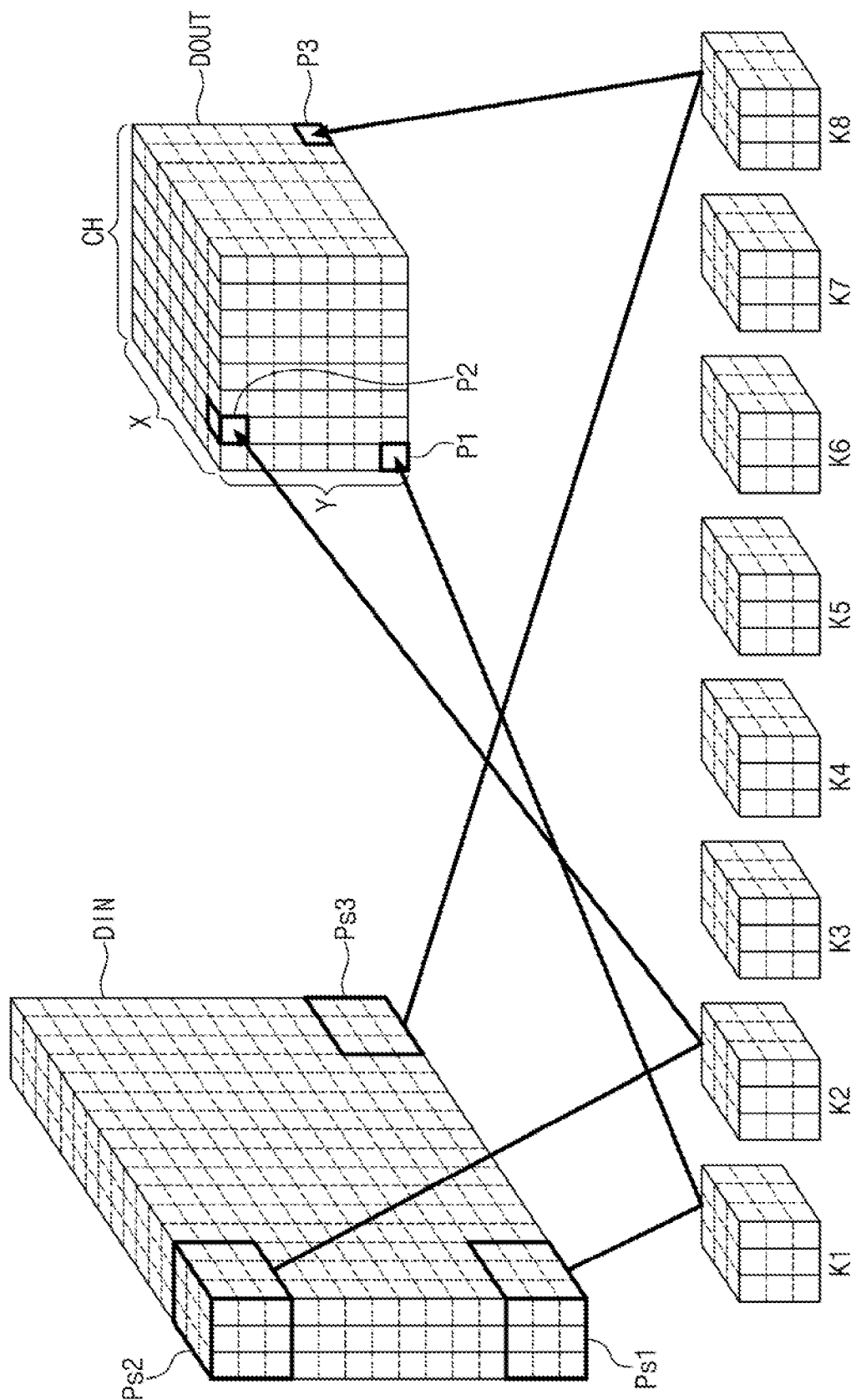
FIG. 4 is a diagram of an example in which at least one convolution layer applies input pixel data to kernels to generate output pixel data, according to an embodiment of the inventive concept.

FIG. 4 is a diagram of an example in which at least one of the convolution layers 132_1 to 132_3 applies input pixel data DIN to kernels K1 to K8 to generate output pixel data DOUT, according to an embodiment of the inventive concept. Referring to FIGS. 2 and 4, the input pixel data DIN may be pixel data of the image IMG, the first intermediate pixel data DINT1, or the second intermediate pixel data DINT2.

The output pixel data DOUT may be the first intermediate pixel data DINT1, the second intermediate pixel data DINT2, or the third intermediate pixel data DINT3. The pixel data DIN or DOUT may be defined by a width "X", a height "Y", and the number of channels CH. For example, the input pixel data DIN may be defined as a matrix of 14 pixels (width) by 14 pixels (height) by "3" channels CH.

The kernels K1 to KS may also be defined by a width "X", a height "Y", and the number of channels CH. For example, each of the kernels K1 to K8 may be defined as a matrix of 3 pixels (width) by 3 pixels (height) by "3" channels CH. The number of channels CH of the kernels K1 to K8 may be identical to the number of channels CH of the input pixel data DIN. Pixel data of the kernels K1 to K8 may be pieces of data of synapses of the CNN. The kernels K1 to K8 are referenced as pixel data in that an operation is taken between the kernels K1 to K8 and the input pixel data DIN.

A convolution layer may calculate a convolution of the input pixel data DIN and each of the kernels K1 to K8. For example, the convolution layer may perform an operation (e.g., inner product) on the pixel data of the first kernel K1 and input pixel data overlapping with the first kernel K1 while moving the first kernel K1 on pixels of the input pixel data DIN. A result of the above-described operation may form one pixel value of the output pixel data DOUT.

Pixel data calculated by the kernels K1 to K8 may form different channels of the output pixel data DOUT. Since the number of the kernels K1 to K8 is "8", the number of channels CH of the output pixel data DOUT may be "8". The number of pixels defined by the width "X" and the height "Y" of the output pixel data DOUT may vary along with varying a kernel (e.g., K1) on pixels of the input pixel data DIN. For example, the output pixel data DOUT may have 7 pixels in width "X" and 7 pixels in height "Y".

In an embodiment, a first pixel value P1 of a first channel of the output pixel data DOUT may be obtained by performing an operation between the first kernel K1 and first pixel data Ps1 of the input pixel data DIN. A second pixel value P2 of a second channel of the output pixel data DOUT may be obtained by performing an operation between the second kernel K2 and second pixel data Ps2 of the input pixel data DIN.

A third pixel value P3 of the last channel of the output pixel data DOUT may be obtained by performing an operation between the eighth kernel K8 and third pixel data Ps3 of the input pixel data DIN. The kernels K1 to K8 may be understood as filters which extract specific information from the input pixel data DIN. The output pixel data DOUT may include pieces of information extracted by the kernels K1 to K8.

The convolution layer may perform the convolution described with reference to FIG. 4 two times or more. Also, the convolution layer may perform an activation operation limiting a range of pixel values of pixel data at least once by using an activation function such as a sigmoid function or a rectified linear unit (ReLU) function. Also, the convolution layer may perform sub sampling for unifying two or more pixel values, such that the number of pixels is reduced, at least once.

Figure 5:
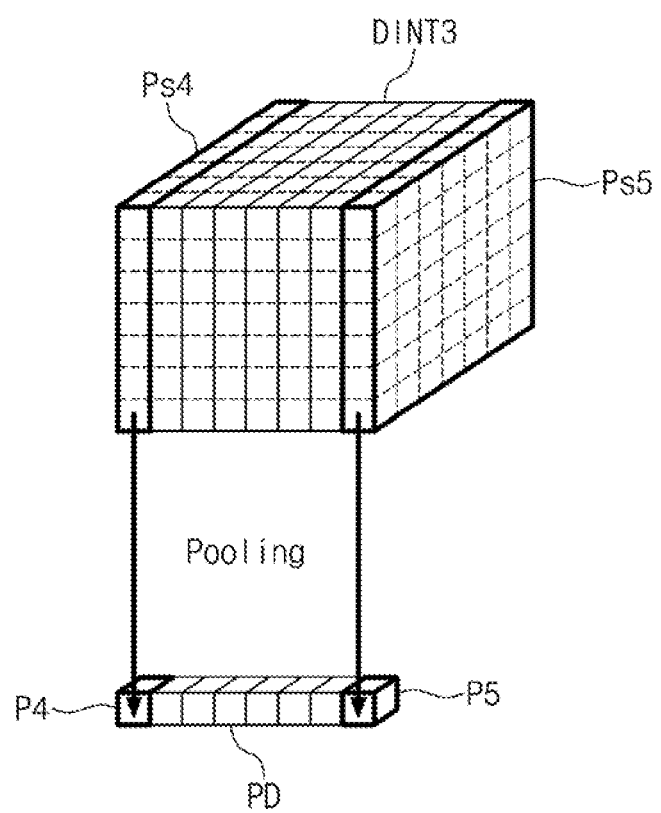
FIG. 5 is a diagram illustrating an example in which a classify layer pools the third intermediate pixel data according to an embodiment of the inventive concept.

FIG. 5 is a diagram illustrating an example in which the classify layer 133 pools the third intermediate pixel data DINT3 according to an embodiment of the inventive concept. Referring to FIGS. 2 and 5, the classify layer 133 may calculate an average of pixel values of each channel of the third intermediate pixel data DINT3. An average value of the pixel values of each channel may form a value of each pixel of pooled data PD.

For example, an average value of the fourth pixel data Ps4 of the third intermediate pixel data DINT3 may form a fourth pixel value P4 of the pooled data PD. An average value of a fifth pixel data Ps5 of the third intermediate pixel data DINT3 may form a fourth pixel value P5 of the pooled data PD. The pooled data PD may be a one-dimensional vector.

Figure 6:
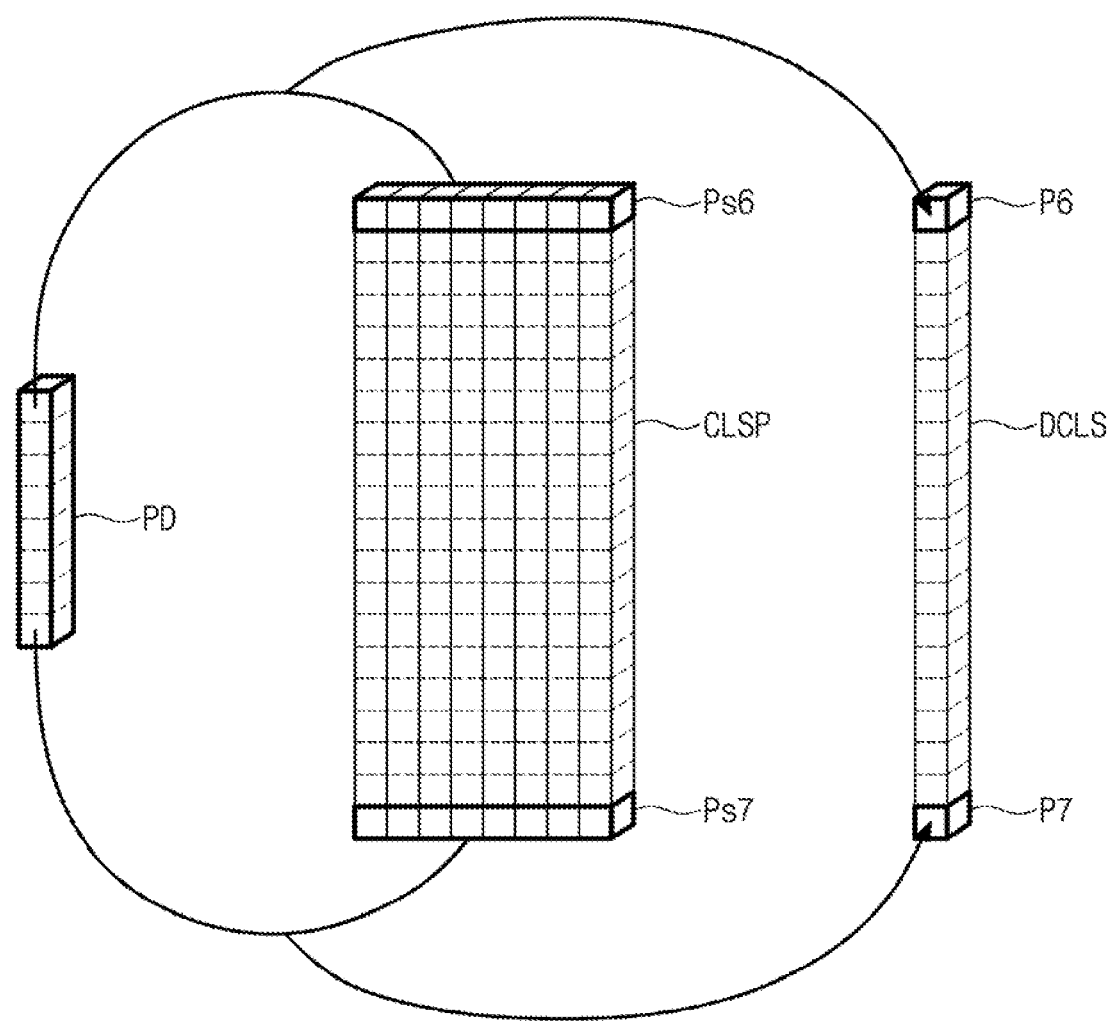
FIG. 6 is a diagram illustrating an example in which a classify layer generates a class of an image according to an embodiment of the inventive concept.

FIG. 6 is a diagram illustrating an example in which the classify layer 133 generates a class of the image IMG according to an embodiment of the inventive concept. Referring to FIGS. 2 and 6, the classify layer 133 may perform an operation between the pooled data PD) and the class parameters CLSP. For example, the classify layer 133 may take an inner product between the pooled data PD and the class parameters CLSP. A result of the inner product may be class data DCLS.

For example, the pooled data PD and sixth pixel data Ps6 of the class parameters CLSP may form a sixth pixel value P6 of the class data DCLS. The pooled data PD and seventh pixel data Ps7 of the class parameters CLSP may form a seventh pixel value P7 of the class data DCLS.

The sixth pixel data Ps6 of the class parameters CLSP may be understood as a filter to detect a feature of one of classes which the classify layer 133 classifies. Pixel values belonging to one height "Y" of the class parameters CLSP may be a filter corresponding to one class. A seventh pixel value P7 of the class data DCLS calculated by the sixth pixel data Ps6 may indicate the probability that the image IMG is one class. For example, the classify layer 133 may determine whether the image IMG belongs to any one of 20 classes. However, any suitable number of classes may be used.

The seventh pixel data Ps7 of the class parameters CLSP may be understood as a filter to detect a feature of another of the classes which the classify layer 133 generates. A ninth pixel value P9 of the class data DCLS calculated by the seventh pixel data Ps7 may indicate the probability that the image IMG is one class.

The classify layer 133 may output information of a class corresponding to the highest value (e.g., probability) of pixel values of the class data DCLS as the second class information ICLS2.

Figure 7:
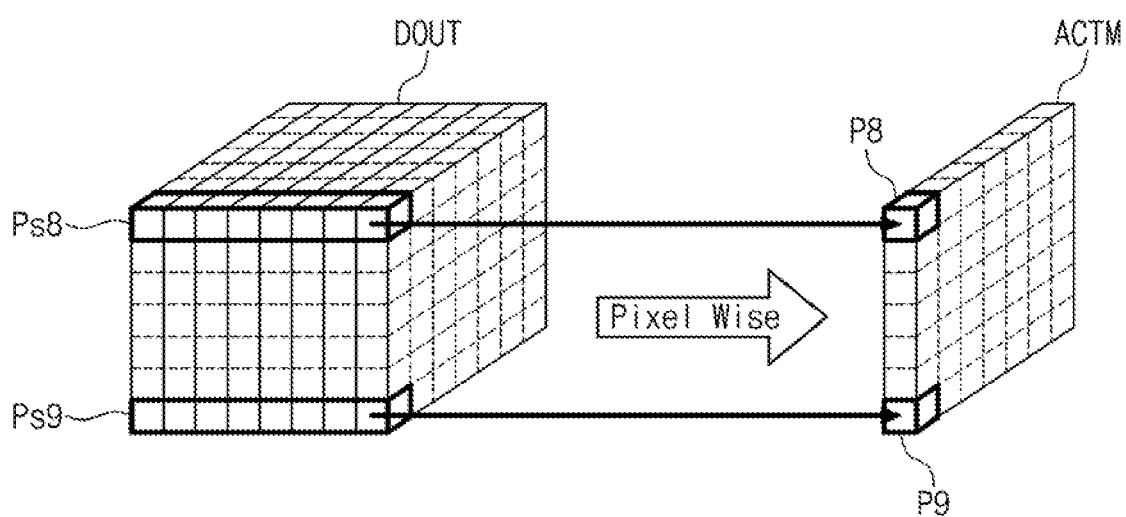
FIG. 7 is a diagram illustrating an example in which one of first to third activation map generation blocks generates an activation map according to an embodiment of the inventive concept.

FIG. 7 is a diagram illustrating an example in which one of the first to third activation map generation blocks 136_1 to 136_3 generates an activation map ACTM according to an embodiment of the inventive concept. Referring to FIGS. 2 and 7, an activation map generation block may generate the activation map ACTM from the output pixel data DOUT. The output pixel data DOUT may be the first intermediate pixel data DINT1, the second intermediate pixel data DINT2, or the third intermediate pixel data DINT3.

The activation map generation block may generate the activation map ACTM by performing a pixel wise operation (e.g., a sum or an average) on the output pixel data DOUT. Values of pixels of channels CH belonging to one width "X" and one height "Y" may form a pixel value of one width "X" and one height "Y" of the activation map ACTM.

For example, eighth pixel data Ps8 of the output pixel data DOUT may form an eighth pixel value P8 of the activation map ACTM. Ninth pixel data Ps9 of the output pixel data DOUT may form a ninth pixel value P9 of the activation map ACTM.

The activation map ACTM indicates a sum or an average of values of a pixel unit of the output pixel data DOUT. In the case where values of specific pixels of the activation map ACTM are greater than values of other pixels, such a case indicates that pixel data of the specific pixels are preferentially (or dominantly) referenced by a convolution layer generating the output pixel data DOUT. That is, the activation map ACTM may be understood as indicating a tendency that a convolution block refers to the input pixel data DIN.

Figure 8:
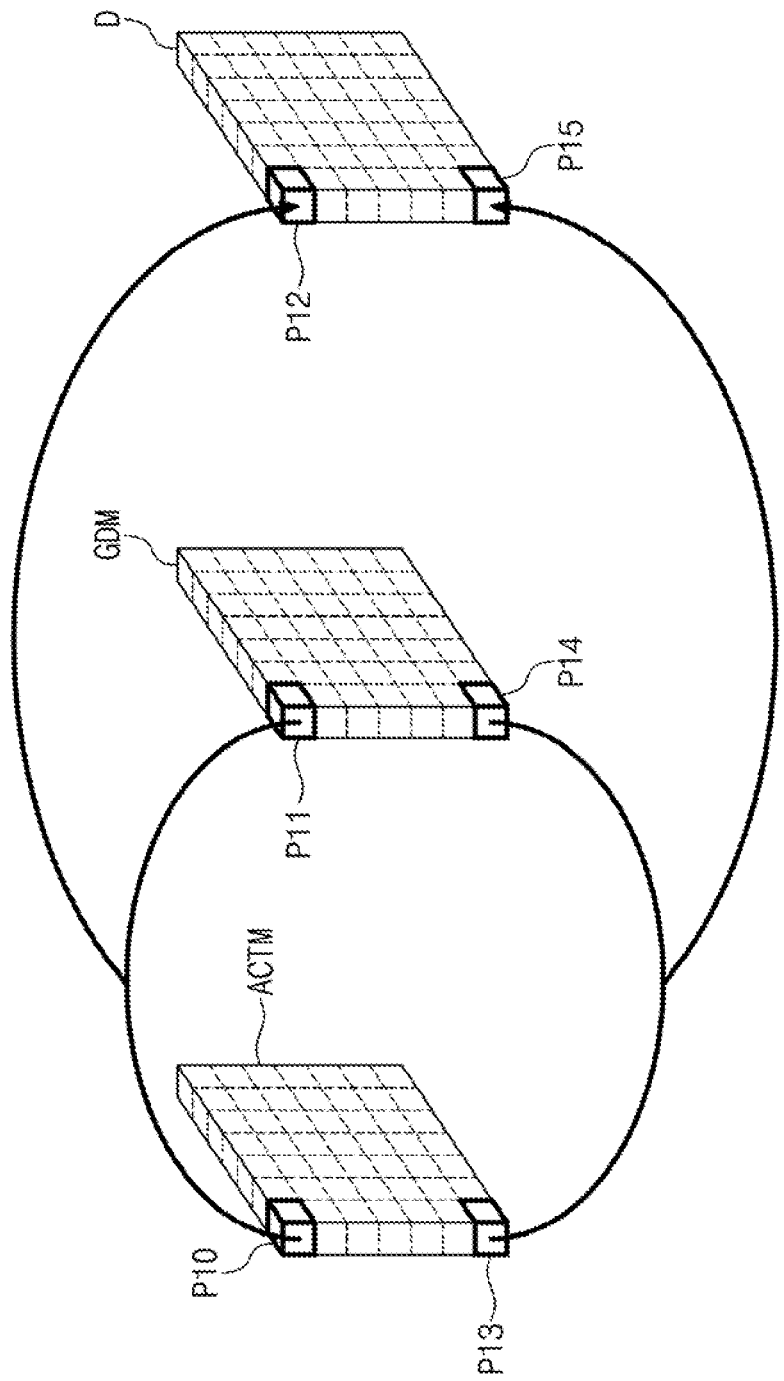
FIG. 8 is a diagram illustrating an example in which one of first to third activation map generation blocks calculates a difference according to an embodiment of the inventive concept.

FIG. 8 is a diagram illustrating an example in which one of the first to third activation map generation blocks 136_1 to 136_3 calculates a guide difference D (e.g., one of D1 to D3) according to an embodiment of the inventive concept. Referring to FIGS. 2 and 8, an activation map generation block may calculate a difference between each pixel of the activation map ACTM and each pixel of the guide map GDM (e.g., one of GDM1 to GDM3) as a value of each pixel of the guide difference D.

For example, a difference between a tenth pixel value P10 of the activation map ACTM and an eleventh pixel value P11 of the guide map GDM is a twelfth pixel value P12 of the guide difference D. A difference between a thirteenth pixel value P13 of the activation map ACTM and a fourteenth pixel value P14 of the guide map GDM is a fifteenth value P15 of the guide difference D.

The loss layer 134 updates weights of a convolution layer such that the guide difference D decreases. That is, the loss layer 134 may update weights such that the convolution layer preferentially (or dominantly) refers to pixel data specified by the guide map GDM. Pixel data to which the convolution layer refers may be intended by the guide map GDM, and the reliability is improved as machine learning is prevented from being hindered and the learning is supported.

Figure 9:
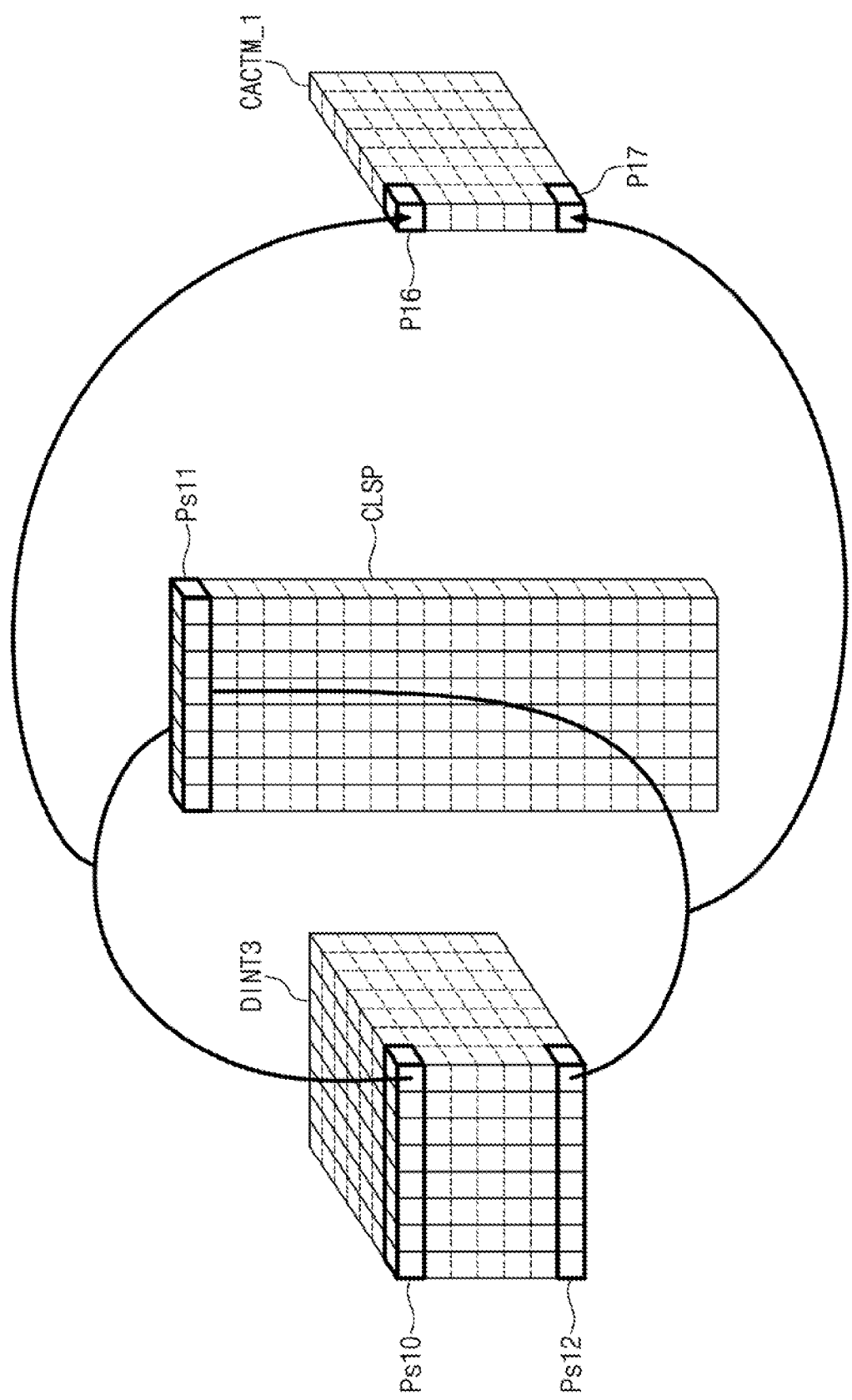
FIG. 9 is a diagram illustrating an example in which a class activation map generation block generates a first class activation map according to an embodiment of the inventive concept.

FIG. 9 is a diagram illustrating an example in which the class activation map generation block 137 generates a first class activation map CACTM_1 according to an embodiment of the inventive concept. Referring to FIGS. 2 and 9, the class activation map generation block 137 may perform an operation (e.g., an inner product) on the third intermediate pixel data DINT3 and pixel data (e.g., Ps11) corresponding to one of the class parameters CLSP.

A sixteenth pixel value P16 of the first class activation map CACTM_1 is obtained by performing an operation between tenth pixel data Ps10 of the third intermediate pixel data DINT3 and eleventh pixel data Ps11 of the class parameters CLSP. A seventeenth pixel value P17 of the first class activation map CACTM_1 is obtained by performing an operation on twelfth pixel data Ps12 of the third intermediate pixel data DINT3 and the eleventh pixel data Ps11 of the class parameters CLSP.

The first class activation map CACTM_1 may indicate pixel data of the third intermediate pixel data DINT3, to which the classify layer 133 preferentially (or dominantly) refers for the purpose of determinizing whether the image IMG is a first class.

Figure 10:
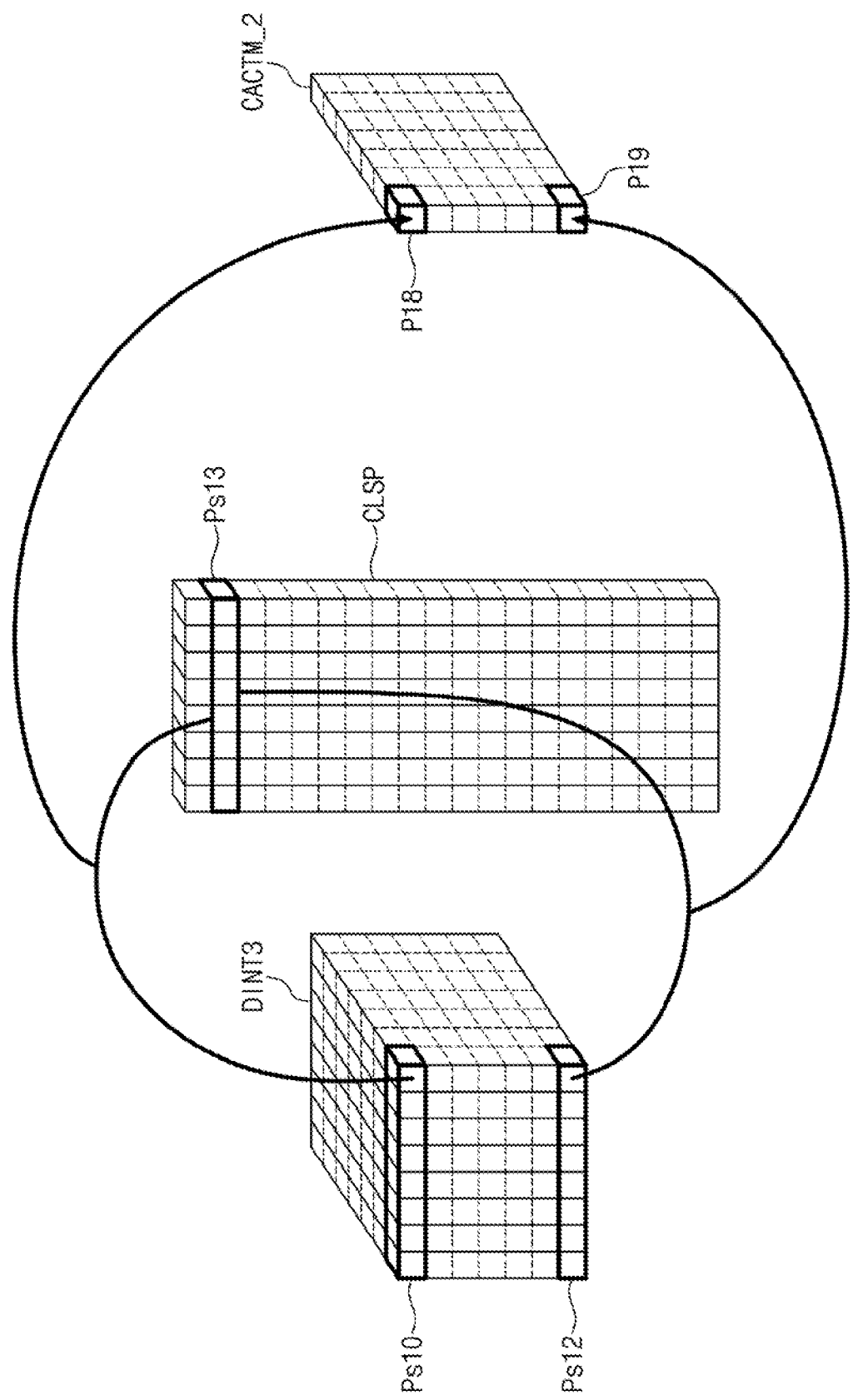
FIG. 10 is a diagram illustrating an example in which a class activation map generation block generates a second class activation map according to an embodiment of the inventive concept.

FIG. 10 is a diagram illustrating an example in which the class activation map generation block 137 generates a second class activation map CACTM_2 according to an embodiment of the inventive concept. Referring to FIGS. 2 and 10, the class activation map generation block 137 may perform an operation (e.g., an inner product) on the third intermediate pixel data DINT3 and pixel data (e.g., Ps11) corresponding to another of the class parameters CLSP.

An eighteenth pixel value P18 of the second class activation map CACTM_2 is obtained by performing an operation between the tenth pixel data Ps10 of the third intermediate pixel data DINT3 and thirteenth pixel data Ps13 of the class parameters CLSP. A nineteenth pixel value P19 of the second class activation map CACTM_2 is obtained by performing an operation between the twelfth pixel data Ps12 of the third intermediate pixel data DINT3 and the thirteenth pixel data Ps13 of the class parameters CLSP.

The second class activation map CACTM_2 may indicate pixel data of the third intermediate pixel data DINT3, to which the classify layer 133 preferentially (or dominantly) refers for the purpose of determining whether the image IMG is a second class.

As described with reference to FIGS. 9 and 10, the class activation map generation block 137 may generate class activation maps respectively associated with classes which the classify layer 133 classifies. For another example, the class activation map generation block 137 may calculate a class activation map associated with a class which the first class information ICLS1 indicates.

In the machine learning process, the machine learning classifier 131 may be trained such that the image IMG is a class (e.g., an original class) pointed out by the first class information ICLS1. Accordingly, by generating a class activation map corresponding to the first class information ICLS1, whether any portion of the third intermediate pixel data DINT3 is referenced may be determined upon classifying the image IMG as belonging to the original class.

As described with reference to FIG. 8, the class activation map generation block 137 may calculate the guide difference D4 between a class activation map of the original class and the fourth guide map GDM4. Since pixel data to which the classify layer 133 should preferentially (or dominantly) refer are guided through a guide map, the machine learning may be prevented from being hindered, and the reliability of the machine learning may be improved.

For another example, the class activation map generation block 137 may calculate 20 class activation maps corresponding to 20 classes. The class activation map generation block 137 may calculate 20 differences D4 by comparing the fourth guide map GDM4 with the 20 class activation maps, respectively. The loss layer 134 may update the class parameters CLSP based on the 20 differences D4.

Figure 11:
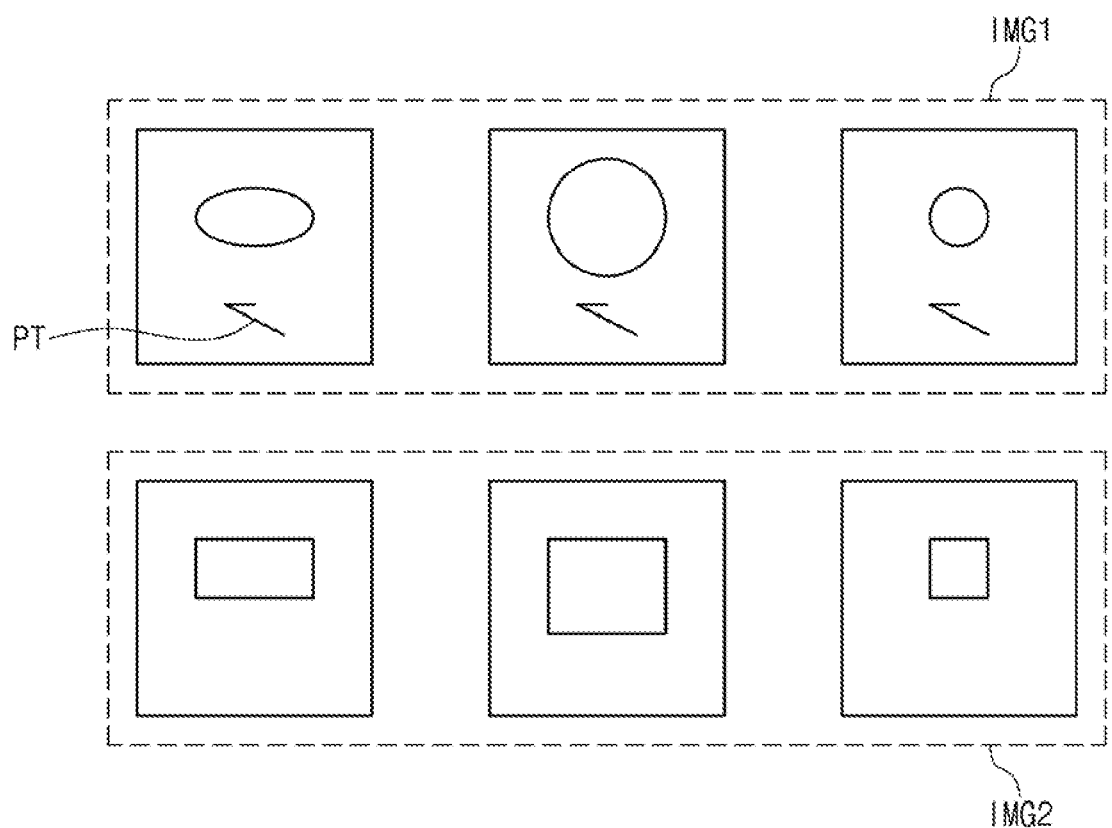
FIG. 11 is a diagram illustrating an example of first images and second images used for machine learning according to an embodiment of the inventive concept.

FIG. 11 is a diagram illustrating an example of first images IMG1 and second images IMG2 used for machine learning according to an embodiment of the inventive concept. Referring to FIGS. 2 and 11, the first images IMG1 may have the first class information ICLS1 corresponding to a circle (i.e., first class information), and the second images IMG2 may have the first class information ICLS1 corresponding to a square (i.e., third class information). The neuromorphic processor 130 may perform machine learning such that the machine learning classifier 131 classifies the first images IMG1 as a circle-shaped class (i.e., second class information) and classifies the second images IMG2 as a square-shaped class (i.e., fourth class information).

However, specific patterns PT may be present in the first images IMG1, and specific patterns may be absent from the second images IMG2. In this case, the machine learning classifier 131 may be trained to perform classification depending on whether the patters PT exist instead of a circle shape of the first images IMG1 or a square shape of the second images IMG2.

Figure 12:
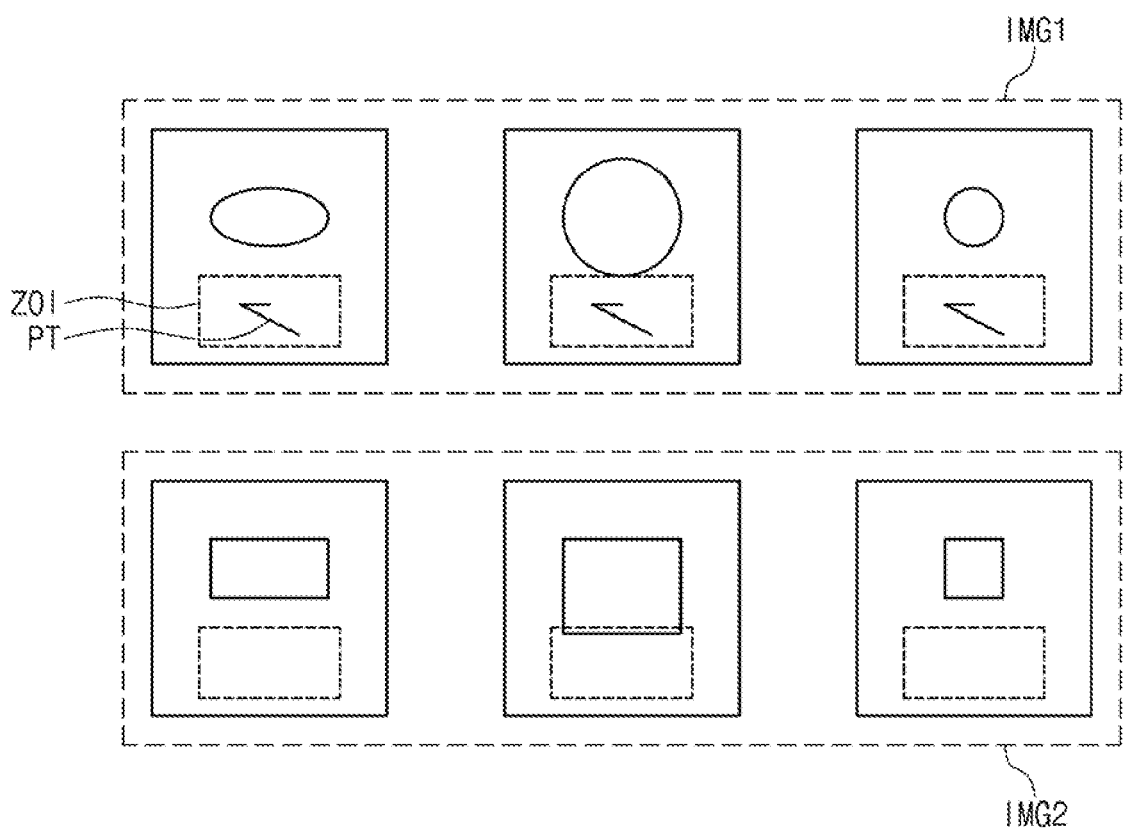
FIG. 12 is a diagram illustrating an example in which a machine learning classifier is trained to perform classification depending on whether patterns exist according to an embodiment of the inventive concept.

FIG. 12 is a diagram illustrating an example in which the machine learning classifier 131 is trained to perform classification depending on whether patterns PT exist according to an embodiment of the inventive concept. Referring to FIGS. 2 and 12, the machine learning classifier 131 may preferentially (or dominantly) refer to pixel data, in which the patterns PT are present, of the first images IMG1 and the second images IMG2. The referenced region may be, for example, a zone of interest ZOI.

The machine learning classifier 131 may classify the first images IMG1, in which the patterns PT are present, as a circle-shaped class (i.e., second class information), and may classify the second images IMG2, from which the patterns PT are absent, as a square-shaped class (i.e., fourth class information).

In the case where the machine learning classifier 131 is trained as described above, the machine learning classifier 131 may classify the image IMG as a circle-shaped class when the patterns PT are present in the image IMG, regardless of whether a shape present in the image IMG is a circle, a square, or a triangle. That is, the patterns PT present in the first images IMG1 may hinder the machine learning of the machine learning classifier 131. Alternatively, the patterns PT present in the first images IMG1 may be understood as patterns making the machine learning classifier 131 difficult to learn.

According to an embodiment of the inventive concept, the guide map GDM is provided upon performing machine learning by using the first images IMG1 including the patterns PT hindering machine learning or making it difficult to learn. By using the guide map GDM, machine learning is prevented from being hindered by the patterns PT, and the reliability of machine learning may be improved.

In an embodiment, whether the machine learning classifier 131 preferentially (or dominantly) refers to any portion of the image IMG may be detected from an activation map or a class activation map. Upon performing machine learning, the image IMG may be provided to the machine learning classifier 131 without the guide map GDM. Whether machine learning is performed preferentially (or dominantly) with reference to the patterns PT may be determined from an activation map or a class activation map.

In the case where the machine learning is performed preferentially (or dominantly) with reference to the patterns PT, the image IMG may again be provided to the machine learning classifier 131 together with the guide map GDM. For example, after the machine learning classifier 131 is restored to exclude machine learning performed by using the image IMG without the guide map GDM, the image IMG may again be classified by using the guide map GDM.

Figure 13:
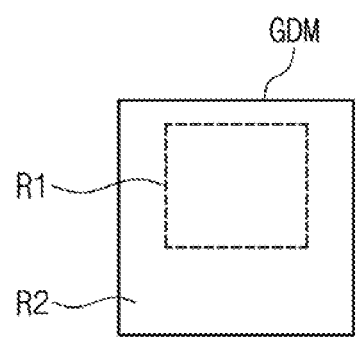
FIG. 13 is a diagram illustrating an example of a guide map applied to first images according to an embodiment of the inventive concept.

FIG. 13 is a diagram illustrating an example of the guide map GDM applied to the first images IMG1 according to an embodiment of the inventive concept. Referring to FIGS. 2, 12, and 13, the guide map GDM may be divided into a first region R1 and a second region R2. Pixel values (e.g., weights) of the first region R1 may be greater than pixel values (e.g., weights) of the second region R2. The first region R1 may correspond to a position of the circle of the first images IMG1. In the case where machine learning is performed on the first images IMG1 by using the guide map GDM, the machine learning classifier 131 may exclude the patterns PT and may perform machine learning.

An embodiment is described where the guide map GDM is divided into two regions. However, the guide map GDM may be divided into three or more regions. Pixel values (e.g., weights) of the three or more regions may be different from each other. A shape of each region may be specified similarly to a shape of defects occurring in a semiconductor device.

Figure 14:
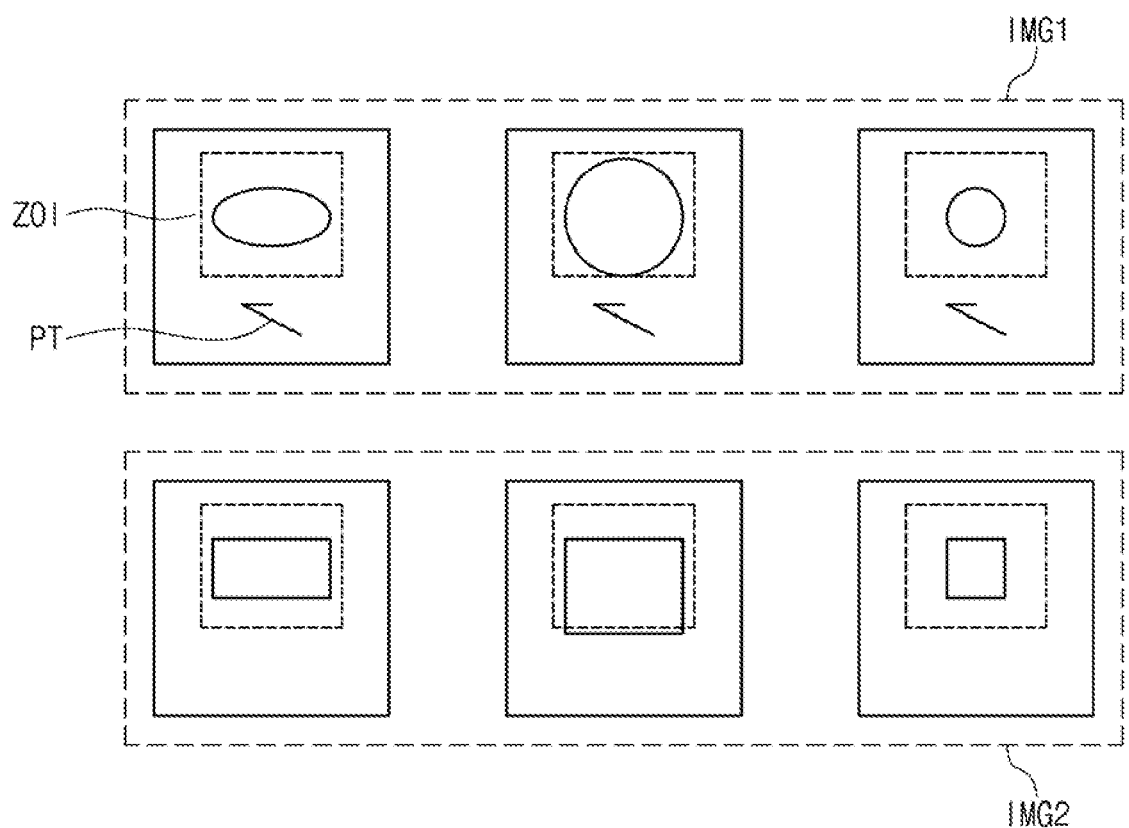
FIG. 14 is a diagram illustrating an example of performing machine learning by using a guide map according to an embodiment of the inventive concept.

FIG. 14 is a diagram illustrating an example of performing machine learning by using the guide map GDM according to an embodiment of the inventive concept. Referring to FIGS. 2 and 14, the machine learning classifier 131 may set a region corresponding to a shape of a circle or a shape of a square to a zone of interest ZOI.

That is, the machine learning classifier 131 may classify the first images IMG1 as a class of a circle with reference to the shape of the circle of the first images IMG1, and may classify the second images IMG2 as a class of a square with reference to the shape of the square of the second images IMG2.

According to the inventive concept, the machine learning classifier 131 may perform machine learning with reference to the guide map GDM. The guide map GDM may be provided with regard to an image IMG which does not have a pattern hindering the learning or making it difficult to learn, as well as the image IMG which does have a pattern hindering the learning or making difficult to learn.

In the case where a guide map is provided with regard to images used as a material of learning, the machine learning classifier 131 may perform learning on conditions which should be considered preferentially (or dominantly) upon classifying images. For example, by using the guide map GDM having a high weight in a specific region of images as illustrated in FIG. 14, the machine learning classifier 131 may be trained to perform classification preferentially (or dominantly) in consideration of a relevant region. Accordingly, a classification method of the machine learning classifier 131 may be intended, and the reliability is improved.

Figure 15:
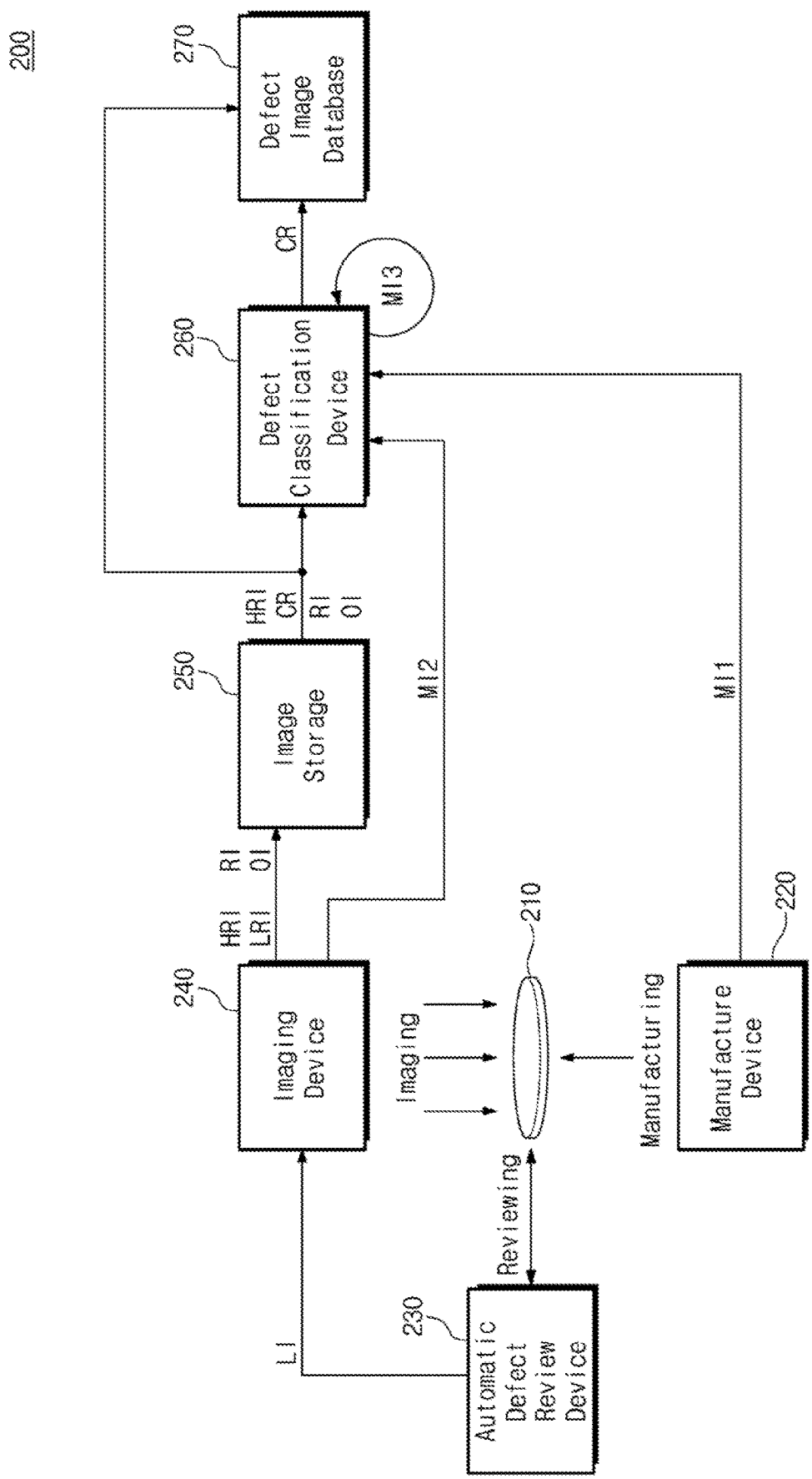
FIG. 15 is a block diagram illustrating a semiconductor defect classification system according to an embodiment of the inventive concept.

FIG. 15 is a block diagram illustrating a semiconductor defect classification system 200 according to an embodiment of the inventive concept. Referring to FIG. 15, the semiconductor defect classification system 200 includes a wafer 210, a manufacture device 220, an automatic defect review device 230, an imaging device 240, image storage 250, a semiconductor defect classification device 260, and a defect image database 270.

The wafer 210 may be used as a substrate of semiconductor devices. For example, the wafer 210 may include a material having a semiconductor characteristic, such as silicon (Si), gallium arsenic (GaAs), etc. The manufacture device 220 may apply various processes for manufacturing semiconductor devices to the wafer 210.

For example, the manufacture device 220 may sequentially apply various processes, such as etching, deposition, planarization, etc., to the wafer 210. The manufacture device 220 may apply various processes to the wafer 210 to form various semiconductor patterns on the wafer 210.

The manufacture device 220 may output information about manufacturing the wafer 210 as first meta information MI1. For example, the first meta information MI1 may include information about a kind of the manufacture device 220 processing the wafer 210, information about a kind of a semiconductor device to be manufactured by processing the wafer 210, etc.

The first meta information MI1 may further include information about a kind of a process used for the manufacture device 220 to process the wafer 210. For example, the first meta information MI1 may include information about a kind of a process (or kinds of processes), which the manufacture device 220 applies to the wafer 210, between a previous review and a current review of the automatic defect review device 230 or between previous imaging and current imaging of the imaging device 240.

The first meta information MI1 may further include information about a process step which the manufacture device 220 performs with respect to the wafer 210. For example, the first meta information MI1 may include information of processes, which are applied to the wafer 210 until a current review of the automatic defect review device 230 or until current imaging of the imaging device 240, from among processes applied to the wafer 210.

The automatic defect review device 230 may review whether a defect is present in semiconductor patterns of the wafer 210, after each process is applied to the wafer 210, after a specific number of processes are applied, or after one of processes designated as a review point is applied. The automatic defect review device 230 may transfer location information LI of a location (locations), which is predicted as a defect exists, to the imaging device 240.

The imaging device 240 may produce images of locations, which are predicted as a defect is present in semiconductor patterns on the wafer 210, based on the location information LI. For example, the imaging device 240 may include an SEM (Scanning Electron Microscopy) device or an OM (Optical Microscopy) device.

The imaging device 240 may output a high resolution image HRI, a low resolution image LRI, and a reference image RI, based on the SEM imaging. The imaging device 240 may output an optical image OI based on the OM imaging.

The high resolution image HRI and the low resolution image LRI may be an image of a location predicted to have a defect, that is, an image of a location based on the location information LI. The reference image RI may have the same resolution as the low resolution image LRI. The reference image RI may be an image of a location where a defect does not exist.

For example, the reference image RI may be an image of any location on the wafer 210, which is not associated with the location information LI. A location on the wafer 210, at which the reference image RI is captured, may be randomly selected by the imaging device 240 or may be designated by a manager.

The imaging device 240 may output information about the imaging device 240 or information about imaging semiconductor patterns of the wafer 210 as second meta information MI2. For example, the second meta information MI2 may include at least one of information about a kind of the imaging device 240, information about a distance, a location, or an angle of the imaging device 240 upon taking images of the semiconductor patterns of the wafer 210, and information about locations on the wafer 210, which are estimated as having a defect.

The image storage 250 may store the high resolution image HRI, the low resolution image LRI, the reference image RI, and the optical image OI output from the imaging device 240. The image storage 250 may output the high resolution image HRI, the low resolution image LRI, the reference image RI, and the optical image OI in response to a request.

The image storage 250 may include a volatile memory such as a dynamic random access memory (DRAM) or a static random access memory (SRAM) or a nonvolatile memory such as a flash memory, a magnetic RAM (MRA), a phase-change RAM (PRAM), a ferroelectric RAM (FRAM), or a resistive RAM (RRAM).

The semiconductor defect classification device 260 may receive the high resolution image HRI, the low resolution image LRI, the reference image RI, and the optical image OI from the image storage 250. The semiconductor defect classification device 260 may receive the first meta information MI1 from the manufacture device 220 and may receive the second meta information M12 from the imaging device 240.

The semiconductor defect classification device 260 may classify (or determine), based on machine learning, whether semiconductor patterns of the wafer 210 associated with images have a defect, by using the high resolution image HRI, the low resolution image LRI, the reference image RI, the optical image OI, the first meta information MI1, the second meta information MI2, and third meta information MI3.

For example, the third meta information M13 may include internal information associated with the machine learning of the semiconductor defect classification device 260. The third meta information MI3 may include information about a creator associated with the machine learning of the semiconductor defect classification device 260.

The semiconductor defect classification device 260 may include a classifier (e.g., 171) which identifies and/or classifies defects, based on the machine learning, using the high resolution image HRI, the low resolution image LRI, the reference image RI, the optical image OI, and the first to third meta information MI1 to MI3. The semiconductor defect classification device 260 may output a classification result CR.

For example, the machine learning may be performed based on images of semiconductor patterns previously classified as having a defect. The machine learning may be performed depending on the method described with reference to FIGS. 1 to 14. A classifier which indicates a defect or a normal state may be created from the images of the semiconductor patterns, as a result of the machine learning. The semiconductor defect classification device 260 may include a machine learning-based classifier and may perform classification on the images.

If the classification result CR indicates a class of a specific defect, semiconductor patterns associated with the images may also classified as having that defect. The classification result CR may also be transmitted to a manager. In the case where the classification result CR indicates a defect, the high resolution image HRI, the low resolution image LRI, the reference image RI, and the optical image OI may be stored to the defect image database 270.

In the case where the classification result CR indicates a normal state, the semiconductor patterns associated with the images are classified as not having a defect. The classification result CR may be notified to the manager. If the classification result CR indicates a normal state, the high resolution image HRI, the low resolution image LRI, the reference image RI, and the optical image OI may not be stored to the defect image database 270.

The defect image database 270 may store images of semiconductor patterns classified as having a defect by the semiconductor defect classification device 260. In the case where a learning condition is satisfied, the machine learning may be performed by using the images stored in the defect image database 270. In some cases, the machine learning may be performed using additional images representing a normal state.

For example, a classifier loaded onto the semiconductor defect classification device 260 may be updated by the machine learning, which uses the images stored in the defect image database 270. For example, the learning condition may be satisfied based on the number of images stored in the defect image database 270, a capacity of the images, a time when the stored images reach a specific value, or when the performance of the machine learning-based classification decreases. As another example, the learning condition may be satisfied manually on the control of a manager.

In the above-described embodiments, components according to embodiments of the inventive concept are described by using various blocks. The "block" may be implemented with various hardware devices, such as an integrated circuit, an application specific IC (ASCI), a field programmable gate array (FPGA), and a complex programmable logic device (CPLD), software, such as firmware and applications driven in hardware devices, or a combination of a hardware device and software. Also, "block" may include circuits or intellectual property (IP) implemented with semiconductor devices.

According to the inventive concept, images in which specific patterns are present are trained together with a guide map. Accordingly, a machine learning device, which prevents learning of a machine learning classifier from being wrong due to the specific images and supports a guide associated with patterns making the learning difficult, and a machine learning method of the machine learning device are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A machine learning method of a machine learning device including a machine learning classifier, the method comprising:
    receiving, at the machine learning device, an image and first class information associated with the image;
    generating, at the machine learning device, second class information associated with the image by performing classification on the image by using the machine learning classifier; and
    after the second class information is generated, updating, at the machine learning device, the machine learning classifier by performing a first learning operation when a guide map is received together with the image and performing, at the machine learning device, a second learning operation different from the first learning operation when the guide map is not received together with the image,
    wherein the first learning operation includes:
    calculating an activation map indicating specific pixel data to be preferentially referenced among pixel data associated with the image when the machine learning classifier generates the second class information;
    comparing the activation map and the guide map; and
    performing back propagation depending on a result of the classification and a result of the comparing.

2. The method of claim 1, wherein the machine learning classifier is based on a convolutional neural network (CNN).

3. The method of claim 2, wherein the guide map assigns one of a first weight and a second weight to each pixel data of the image.

4. The method of claim 3, wherein the first learning operation updates, at the machine learning device, the machine learning classifier preferentially with reference to first pixel data, to which the first weight is assigned, rather than second pixel data to which the second weight is assigned.

5. The method of claim 2, wherein the guide map assigns one of three or more weights to each pixel data of the image.

6. The method of claim 1, wherein the machine learning classifier includes two or more convolution layers,
    wherein the pixel data associated with the image are output from one convolution layer of the two or more convolution layers, and
    wherein the activation map is calculated from the pixel data output from the one convolution layer.

7. The method of claim 6, wherein the activation map is calculated by a sum or an average of a pixel unit of the pixel data output from the one convolution layer.

8. The method of claim 1, wherein the machine learning classifier includes two or more convolution layers and a classify layer configured to generate the second class information from a pixel data output from the two or more convolution layers, and
    wherein the activation map is calculated from the pixel data and class parameters used for the classify layer to generate the second class information.

9. The method of claim 8, wherein the activation map is calculated by an inner product of the pixel data and the class parameters.

10. The method of claim 1, wherein the calculating of the activation map includes
    calculating activation maps indicating specific pixel data to be preferentially referenced among pixel data associated with the image when the machine learning classifier generates the second class information;
    wherein the comparing of the activation map with the guide map includes comparing the activation maps with the guide map, respectively; and
    wherein the performing of the back propagation includes performing back propagation depending on a result of the classification and a result of the comparing.

11. The method of claim 10, wherein the comparing of the activation maps with the guide map includes:
resizing the guide map to generate guide maps; and
comparing the activation maps and the guide maps, respectively.

12. The method of claim 1, wherein the second learning operation includes:
performing second back propagation depending on a result of the classification.

13. The method of claim 1, wherein the image is an image of a semiconductor device, and
wherein the guide map includes information of a position where a defect causing a fault of the semiconductor device occurs.

14. A machine learning method of a machine learning device including a machine learning classifier, the method comprising:
receiving, at the machine learning device, a first image, first class information associated with the first image, and a guide map associated with the first image;
classifying, at the machine learning device, second class information associated with the first image by performing classification on the image by using the machine learning classifier;
comparing the guide map with an intermediate data generated in the generating of the second class information; and
updating, at the machine learning device, the machine learning classifier depending on a result of the classification and a result of the comparing,
wherein the comparing of the guide map with the intermediate data includes:
generating an activation map indicating data to be referenced dominantly in the classifying of the second class information from the intermediate data; and
comparing the activation map and the guide map.

15. The method of claim 14, further comprising:
receiving, at the machine learning device, a second image and third class information associated with the second image;
generating, at the machine learning device, fourth class information associated with the second image by performing classification on the second image by using the machine learning classifier; and
further updating, at the machine learning device, the machine learning classifier depending on a result of the generating of the fourth class information.

16. The method of claim 14, further comprising:
transferring the machine learning classifier to a semiconductor defect classification device.

17. A machine learning device comprising:
a modem configured to receive an image, first class information associated with the image, and a guide map associated with the image from an image database; and
a processor including a machine learning classifier and configured to perform machine learning by classifying the image by using the machine learning classifier and updating the machine learning classifier depending on a result of the classifying of the image,
wherein the processor is configured to:
obtain second class information associated with the image by classifying the image by using the machine learning classifier;
perform a first comparison on the first class information and the second class information;
perform a second comparison on the guide map and an intermediate data generated in the classifying of the image; and
update the machine learning classifier depending on a result of the first comparison and a result of the second comparison,
wherein the second comparison includes:
generating an activation map indicating data to be referenced dominantly in the classifying of the second class information from the intermediate data; and
comparing the activation map and the guide map.

18. The machine learning device of claim 17, wherein, when the machine learning classifier is completely updated, the modem is further configured to transmit the machine learning classifier to a semiconductor defect classification device.

* * * * *